United States Patent
Knox et al.

(10) Patent No.: US 10,626,546 B2
(45) Date of Patent: Apr. 21, 2020

(54) CARBON CORD FOR REINFORCED RUBBER PRODUCTS AND THE PRODUCTS

(71) Applicants: THE GATES CORPORATION, Denver, CO (US); IMPERIAL COLLEGE LONDON, South Kensington, London (GB)

(72) Inventors: John Graeme Knox, Oxford, MI (US); Alexander Bismarck, London (GB); Su Bai, London (GB)

(73) Assignee: Gates Corporation, Denver, CO (US)

( * ) Notice: Subject to any disclaimer, the term of this patent is extended or adjusted under 35 U.S.C. 154(b) by 600 days.

(21) Appl. No.: 14/408,511

(22) PCT Filed: Jun. 24, 2013

(86) PCT No.: PCT/US2013/047276
§ 371 (c)(1),
(2) Date: Dec. 16, 2014

(87) PCT Pub. No.: WO2014/004359
PCT Pub. Date: Jan. 3, 2014

(65) Prior Publication Data
US 2015/0152590 A1 Jun. 4, 2015

Related U.S. Application Data

(60) Provisional application No. 61/663,621, filed on Jun. 24, 2012.

(51) Int. Cl.
*D06M 14/36* (2006.01)
*D02G 3/44* (2006.01)
(Continued)

(52) U.S. Cl.
CPC ............. *D06M 14/36* (2013.01); *B29D 29/08* (2013.01); *B60C 9/0028* (2013.01); *C08J 5/06* (2013.01);
(Continued)

(58) Field of Classification Search
None
See application file for complete search history.

(56) References Cited

U.S. PATENT DOCUMENTS

| | | |
|---|---|---|
| 5,283,119 A | 2/1994 | Shuttleworth et al. |
| 5,290,378 A | 3/1994 | Kusano et al. |

(Continued)

FOREIGN PATENT DOCUMENTS

| | | |
|---|---|---|
| CN | 1111258 A | 11/1995 |
| CN | 101413209 A | 4/2009 |

(Continued)

OTHER PUBLICATIONS

S Bai et al., Atmospheric Plasma Polymerisation of Carbon Fibres: Impact on Adhesion to Polyurethane elastomer, Aug. 26, 2011, pp. 1-6, South Kensington Campous, London; Retrieved from the internet: URL:http://www.iccm-central.org/Proceedings/ICCM18proceedings/data/2.%200ral%20Presentation/Aug22(Monday)/M31%20Fibres,%20Matrices%20and%20Interfaces/M31-1-AF0403.pdf.

(Continued)

*Primary Examiner* — Matthew J Daniels
*Assistant Examiner* — Mohammad M Ameen
(74) *Attorney, Agent, or Firm* — Paul N. Dunlap, Esq.

(57) ABSTRACT

A treated carbon fiber tensile cord for use in power transmission belts, hose, tires or other reinforced rubber products and the resulting product, which includes carbon fibers which are coated with a polymeric layer deposited and polymerized at atmospheric pressure in a plasma assisted (Continued)

chemical vapor deposition process. A suitable polymeric layer is compatible with the intended matrix which the cord will reinforce. For a rubber belt, the coating is compatible with the rubber composition of the belt body or an adhesion gum or adhesive such as RFL which surrounds the cord. For RFL/rubber systems and cast polyurethane elastomers, a suitable polymer is the APP reaction product of a vinyl carboxylic acid or an ester or amide thereof. Suitable carboxylic acids include acrylic acid and methacrylic acid. Various esters and amides of vinyl carboxylic acid are also suitable, such as 2-hydroxyethyl methacrylate, N-isobutoxymethyl acrylamide, and N-hydroxyethyl acrylamide.

12 Claims, 3 Drawing Sheets

(51) Int. Cl.

| | | |
|---|---|---|
| D01F 11/16 | (2006.01) | |
| C08J 5/06 | (2006.01) | |
| F16G 1/10 | (2006.01) | |
| F16G 5/08 | (2006.01) | |
| F16G 5/20 | (2006.01) | |
| D06M 10/10 | (2006.01) | |
| F16G 1/28 | (2006.01) | |
| B29D 29/08 | (2006.01) | |
| B60C 9/00 | (2006.01) | |
| C08K 9/04 | (2006.01) | |
| C09D 133/02 | (2006.01) | |
| C09D 133/10 | (2006.01) | |
| C09D 133/26 | (2006.01) | |
| D02G 3/36 | (2006.01) | |
| D02G 3/48 | (2006.01) | |

(52) U.S. Cl.
CPC .............. *C08K 9/04* (2013.01); *C09D 133/02* (2013.01); *C09D 133/10* (2013.01); *C09D 133/26* (2013.01); *D01F 11/16* (2013.01); *D02G 3/36* (2013.01); *D02G 3/447* (2013.01); *D02G 3/48* (2013.01); *D06M 10/10* (2013.01); *F16G 1/10* (2013.01); *F16G 1/28* (2013.01); *F16G 5/08* (2013.01); *F16G 5/20* (2013.01); *C08J 2321/00* (2013.01); *D10B 2101/12* (2013.01); *Y10T 428/1397* (2015.01); *Y10T 428/2918* (2015.01)

(56) References Cited

U.S. PATENT DOCUMENTS

| | | | |
|---|---|---|---|
| 5,323,829 A * | 6/1994 | Hubbell | ................ B60C 9/0042 152/451 |
| 5,376,413 A | 12/1994 | Callebert et al. | |
| 5,453,467 A * | 9/1995 | Bamford | ............. A61L 33/0088 427/2.24 |
| 5,863,987 A | 1/1999 | Nakamura et al. | |
| 6,096,156 A | 8/2000 | Morin et al. | |
| 7,455,892 B2 | 11/2008 | Goodwin et al. | |
| 7,744,984 B2 | 6/2010 | Haack et al. | |
| 7,824,495 B1 | 11/2010 | White et al. | |
| 8,227,051 B1 | 7/2012 | Paulauskas et al. | |
| 8,399,064 B2 | 3/2013 | Schultz et al. | |
| 2003/0116281 A1 | 6/2003 | Herbert et al. | |
| 2006/0004126 A1 | 1/2006 | Park et al. | |
| 2009/0148615 A1 | 6/2009 | Vangeneugden et al. | |
| 2011/0079505 A1 | 4/2011 | White et al. | |
| 2011/0241269 A1* | 10/2011 | Siffer | ........................ C08J 5/041 267/113 |
| 2012/0201973 A1* | 8/2012 | Guo | .......................... C08J 3/28 427/539 |
| 2013/0048485 A1 | 2/2013 | Paulauskas et al. | |

FOREIGN PATENT DOCUMENTS

| | | |
|---|---|---|
| EP | 2371882 A1 | 10/2011 |
| JP | 63-196772 A | 8/1988 |
| JP | 2001-316976 A | 11/2001 |
| KR | 20120055042 A | 5/2012 |
| WO | 2006135347 A1 | 12/2006 |
| WO | WO-2010-040840 A2 * | 4/2010 |
| WO | 2012009604 A2 | 1/2012 |

OTHER PUBLICATIONS

Weisweiler W et al., Surface Modification of Carbon Fibres by Plasma Polymerization, Thin Solid Films, Elsevier-Sequoia S.A., Lausanne, CH, vol. 207, No. 1-2, Jan. 30, 1992, pp. 158-165.
State Intellectual Property Office of the People's Republic of China; Notification of the First Office Action (PCT Application in the National Phase); Date of Notification: Nov. 25, 2015.

* cited by examiner

CARBON CORD FOR REINFORCED RUBBER PRODUCTS AND THE PRODUCTS

BACKGROUND OF THE INVENTION

Field of the Invention

This invention relates generally to treated carbon fiber tensile cord for reinforced elastomeric composite products such as power transmission belts, more particularly to atmospheric plasma polymerization treatment for carbon cord.

Description of the Prior Art

Carbon fiber tensile cords show potential for reinforcing flexible rubber products subject to dynamic stresses, such as power transmission belts, hose, and tires. Resorcinol-formaldehyde-latex ("RFL") adhesive treatments are currently in use to facilitate bonding of rubber to carbon fiber. Mechanical interlocking is known to be the main interaction between the fibers and the RFL as compared to chemical bonding. T-block adhesion testing of so treated carbon cords shows separation between the fiber and the RFL. Adhesion between carbon fibers and RFL needs improvement to eliminate the failure mode of delamination of the belt teeth from the cord in current carbon belt systems.

Epoxy primers and/or sizes have been investigated to improve the adhesion of the RFL to carbon fiber surface. However, epoxy primers have not eliminated delamination at the fiber surface layer due to lack of chemical bonding between the epoxy and the fiber surface. Currently, mechanical interlocking of RFL into the carbon fiber tow remains as the primary technique to allow carbon fiber cords to be used in rubber belting.

Previous attempts to use plasma for surface cleaning and for coating or activating cord are known, but have not been found to be satisfactory for the dynamic rubber applications described herein.

SUMMARY

The present invention is directed to systems and methods which provide improved adhesion between carbon fiber and elastomers for improved performance in carbon-fiber reinforced products such as power transmission belts, hose or tires. Carbon yarn, as received from the manufacturer is treated. Such carbon fiber generally has a sizing on it.

Atmospheric plasma polymerization ("APP") was performed on carbon fibers. Air was used as ionization gas. Precursors used for APP were acrylic acid, 2-hydroxyethyl methacrylate, N-(isobutoxymethyl)acrylamide, and N-hydroxyethyl acrylamide. Different APP treatment configurations were explored to determine the optimum way to modify carbon fibers continuously in atmospheric plasma. The precursor vapor was supplied with different dosing rates by nebulizer. In order to examine the influences of APP on carbon fibers and the interfacial interaction between fiber and elastomeric matrix, the surface and bulk properties characterization of carbon fibers has been conducted, including dynamic contact angle, zeta-potential, BET surface area, XPS, single fiber tensile strength measurements, and micromechanical characterization of adhesion behaviors of carbon fiber to RFL elastomeric matrix and to PU elastomer have been characterized through single fiber fragmentation tests and single fiber pull out tests on model composites.

APP polymerization on the carbon fiber allows for increased functionality of the fiber surface, leading to increased chemical bonding of the fiber to PU or RFL (or other compatible interlocking material). Micromechanical characterization of adhesion behavior between carbon fibers and elastomeric matrix showed significant improvement. Adhesion increased by around 60% with the longest treatment time for RFL matrix in a fragmentation test. Adhesion in a single fiber pull-out test with PU matrix increased by about 114%. This has led to improved failure mode between the belt tooth and cord surface, which is expected to lead to improved belt life.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
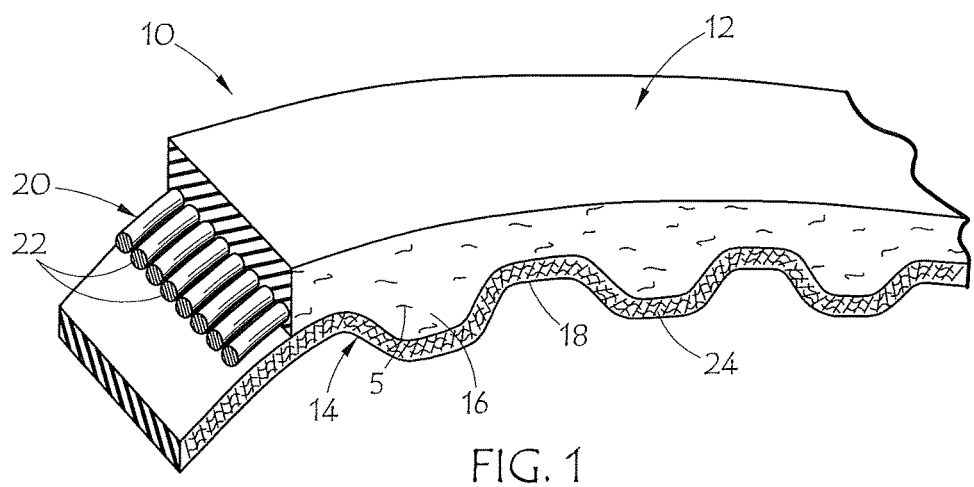
FIG. 1 is a partially fragmented perspective view of a portion of a multi-V-ribbed belt constructed in accordance with an embodiment of the present invention.

The invention is directed to a treated carbon fiber tensile cord for use in power transmission belts, hose, tires or other reinforced rubber products and the resulting product. The tensile cord includes carbon fibers which are coated with a suitable polymeric layer deposited and polymerized at atmospheric pressure in a plasma assisted chemical vapor deposition process. A suitable polymeric layer is one that is compatible with the intended matrix which the cord will reinforce. For example, for a rubber belt, the coating should be compatible with the rubber composition of the belt body or adhesion gum which will surround the cord. Resorcinol-formaldehyde-latex ("RFL") cord treatments are often used as the matrix immediately surrounding the fibers in rubber belts. For rubber and polyurethane ("PU") belt compounds, a suitable precursor or monomer, is one with lower molecule weight and double bonds which contains carboxyl, hydroxyl, ester, imide, carbonyl, or amide functional groups that can be easily polymerized and/or crosslinked in the plasma and which can form a polymer which can provide the main contribution to adhesion by forming the chemical bonding with the matrix. Examples include acrylic acid, 2-hydroxyethyl methacrylate, N-isobutoxymethyl acrylamide, and N-hydroxyethyl acrylamide or in general, functional acrylates, methacrylates or styrene derivatives.

The following describes some Examples of Atmospheric Plasma Polymerization (APP) of various compatible precursors on carbon fiber for use as reinforcement in urethane and rubber power transmission belting, including the test methodologies and APP setup methodologies with and without Nebuliser.

APP was performed on unsized and sized PAN-based carbon fiber obtained from three carbon fiber manufacturers. Type A herein refers to T700GC-91, an unsized fiber from Toray Industries, Tokyo, Japan. Type B herein refers to a sized fiber from Toho Tenax, believed to be epoxy-type size. Type C herein refers to AS4D, an unsized carbon fiber from Hexcel Corporation, Stamford, Conn., USA.

Different APP protocols were explored to determine the optimum method for continuous carbon fiber treatment within atmospheric plasma. Such configurations may be achieved by using afterglow (remote mode) plasmas. By injecting an aerosol precursor directly into the afterglow plasma zone, a controlled, free-radical-induced polymerization reaction can be initiated with minimal fragmentation of the precursor molecules. This can be used to chemically graft highly complex chemical functionalities directly onto a variety of substrates to form 'soft-polymerised' plasma coatings in which the precursor properties are retained. Therefore, this configuration enables the adsorption of large molecule fragments at the substrate surface. Two different APP treatment configurations (see FIGS. 5 and 6) were adopted to modify carbon fibers continuously in atmospheric plasma. Each configuration used some basic running conditions, with certain parameter variations studied within each configuration.

Figure 5:
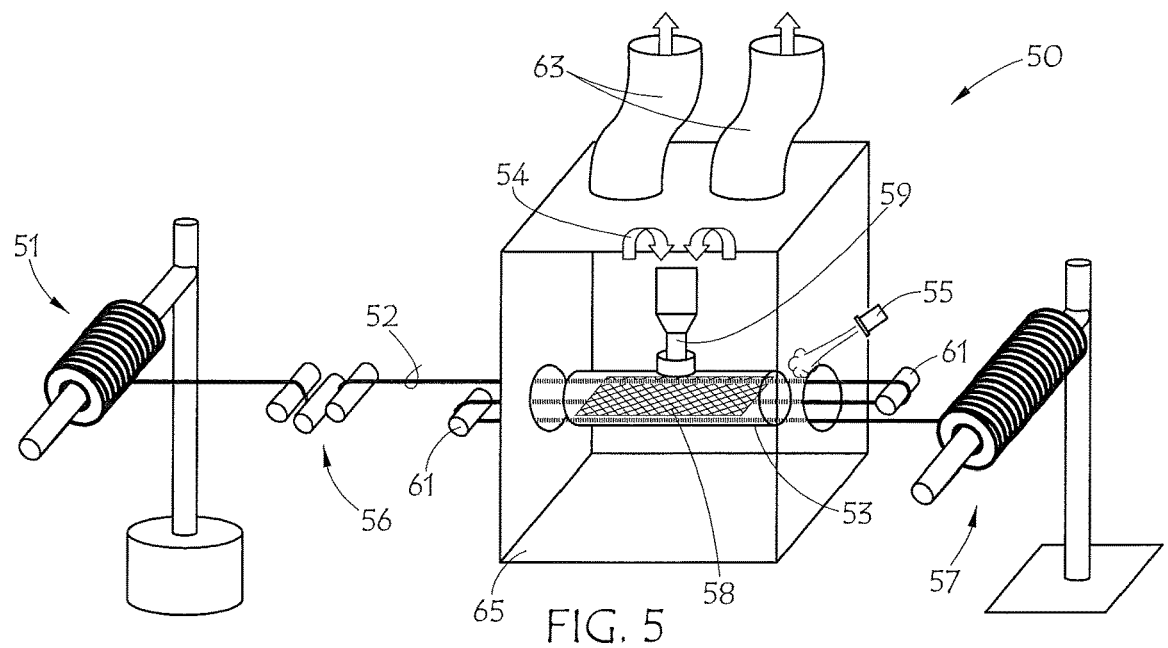
FIG. 5 is a schematic representing a first setup for APP treatment of carbon fiber.

Methodology and Results for a First APP Setup Configuration:

In the first configuration, shown in FIG. 5, the basic setup condition listed in Table 2 was used and the various parameter variations and results are presented in Table 1. The APP was performed in an Openair® plasma Technology system (Plasma Jet PFW10-PAD; Plasmatreat®, Steinhagen, Germany). This system was operated with a power of 2.1 kW (V=296±3V, I=7±0.2 A) and excitation frequency between 15-25 kHz. In the first APP setup 50 shown schematically in FIG. 5, the precursor vapor was supplied by nebulizer 55 (Omron NE-U17 Ultrasonic Nebulizer; OMRON Matsusaka Co., Ltd. Japan). The nebulizer allowed adjustment of flow rate of carrier air and dosing rate of precursor by means of corresponding 10-position dials. Examples 2-7 were run first using the conditions A-F to determine the optimum nebulizer settings as specified in Table 3. Condition F was then used for the remaining Examples in Table 1. Carbon fibers 52 were supplied from let off 51, through glass chamber 53. The fibers were tensioned by pre-tensioning device 56 and wound on take-up winding unit 57. Air was used as the ionization gas with a flow rate of 1350 L/h. The air feed gas enters port 54 where it is ionized and injected through plasma nozzle 59. The precursor vapor is fed by nebulizer 55 with a carrier stream of air flowing 17 L/min (1020 L/h), corresponding to level 10 on the nebulizer's air flow dial. The precursor dosing rate was 3 ml/min, corresponding to level 10 on its flow dial. Aerosol with an average particle size 4.4 µm was generated by nebulizer 55. The precursor carried by air can fill the whole glass tee-piece 53, with very little excess gas flow out the ends of the plasma chamber 53 as it starts to be polymerized and deposited onto the fiber surface once it flows into the plasma active zone. The carbon fiber roving 52 was positioned at a distance of 15 mm from the tip of the plasma jet nozzle 59 inside a 25 cm long glass chamber 53, which was an unequal tee piece (PTU100/25, borosilicate glass 3.3 from QVF Process System Ltd, Stafford, UK). Due to health and safety precautions, the whole plasma zone was housed in a sealed acrylic box 65, with extractors 63. The configuration shown in FIG. 5 allows the fibers to be continuously treated with both sides of the carbon fiber roving exposed to the plasma jet. The carbon fibers were redirected by means of PTFE roller pins 61 allowing the fibers to be looped or passed three times through the glass chamber 53, therefore, maximizing the fibers exposure to APP. A stainless steel mesh 58 could optionally be placed between the top pass of the carbon fiber roving and the second pass of the fiber roving. The function of stainless steel mesh 58 was to block some of the ionized particles, and thereby to reduce the physical sputtering of plasma on the rest of fiber roving. Acrylic acid vapor, for example, can be polymerized onto the fiber surface by UV and rare energetic particles. Without the stainless steel, there will be more competition between polymerization of precursor and physical sputtering of plasma during APP treatment. Six different treatment speeds of 0.18, 0.4, 0.8, 1.4, 2.5, and 5 m/min were chosen, corresponding to residence times within the glass chamber of 4.2, 1.9, 0.9, 0.5, 0.3, and 0.15 minutes, respectively. In order to examine the influences of APP on carbon fibers and the interfacial interaction between the fiber and an elastomeric matrix, characterization of the surface and bulk properties of carbon fibers has been conducted, including dynamic contact angle, zeta-potential, BET surface area, XPS, single fiber tensile strength measurements, and micromechanical characterization of adhesion. The adhesion behavior of carbon fiber to RFL elastomeric matrix has been characterized through single fiber fragmentation tests and to PU elastomer by single fiber pull out tests on model composites. Adhesion is represented by the interfacial shear strength ("IFSS" or $\tau_{IFSS}$).

Precursors used for a first series of APP experiments in the setup of FIG. 5 included acrylic acid (99% purity, Aldrich, UK), 2-hydroxyethyl methacrylate (99% purity, Aldrich, UK), N-isobutoxymethyl acrylamide (technical grade, Aldrich, UK), and N-hydroxyethyl acrylamide (97% purity, Aldrich, UK). The APP with nebulizer setup parameters, speeds, materials, and IFSS test results are shown in Table 1. The reported values vary somewhat from the values reported in the priority application due to remeasurement of the fiber strength, $\sigma_f$, which is used to calculate the IFSS as described below. The conclusions remain the same.

TABLE 1

| Ex. | Precursors | Fiber (Matrix) | Setup | Speed (m/min) | IFSS (MPa) |
|---|---|---|---|---|---|
| 1 | Untreated | Type A- unsized- (RFL) | F with mesh | 0 | 23.4 ± 0.4 |
| 2 | Acrylic acid | | F with mesh | 0.18 | 41.5 ± 0.9 |
| 3 | | | A with mesh | 0.18 | 38.1 ± 0.9 |
| 4 | | | B with mesh | 0.18 | 31.9 ± 0.7 |
| 5 | | | C with mesh | 0.18 | 34.8 ± 0.7 |
| 6 | | | D with mesh | 0.18 | 31.6 ± 0.6 |
| 7 | | | E with mesh | 0.18 | 36.6 ± 0.8 |
| 8 | | | F no mesh | 0.18 | 43.6 ± 1.0 |
| 9 | | | | 0.4 | 33.5 ± 0.6 |
| 10 | | | | 0.8 | 24.2 ± 0.5 |
| 11 | | | | 1.4 | 25.3 ± 0.6 |
| 12 | | | | 2.5 | 29.9 ± 0.7 |
| 13 | | | | 5 | 24.8 ± 0.8 |
| 14 | | Type A- unsized- (PU) | F with mesh | 0.18 | 43.0 ± 1.0 |
| 15 | | | F with mesh | 0.18 | 41.5 ± 1.4 |
| 16 | | Type B- sized (PU) | F no mesh | 0.18 | 46.4 ± 1.5 |
| 17 | Untreated | Type B- sized- (RFL) | | 0 | 23.6 ± 0.5 |
| 18 | Untreated | Type B- sized- (PU) | | 0 | 32.4 ± 3.7 |
| 19 | 2-Hydroxyethyl methacrylate | Type A- unsized- (RFL) | F with mesh | 0.18 | 30.8 ± 0.6 |
| 20 | | | F no mesh | 0.18 | 39.1 ± 1.0 |
| 21 | N-(Isobutoxymethyl) acrylamide | | F with mesh | 0.18 | 34.8 ± 0.6 |
| 22 | | | F no mesh | 0.18 | 32.5 ± 0.6 |
| 23 | N-Hydroxyethyl acrylamide | | F no mesh | 0.18 | 33.1 ± 0.7 |

TABLE 2

APP treatment parameters

| | |
|---|---|
| Flow of Ionized Gas - Air (L/h) | 1350 |
| Flow of carrier gas - Air (L/h) | 1020 |
| Nebulisation rate (ml/min) | 3 |
| Power Input (kW) | 2.1 |
| Stand Off Distance (mm) | 12 |
| Primary Pressure (Bar) | 6 |
| Processing speed (m/min) | 0.18, 0.4, 0.8, 1.4, 2.5, 5 |
| Plasma excitation frequency | 15-25 kHz |

TABLE 3

APP flow and nebulization rates referred to in Table 1.

| Nebulizer Condition | A | B | C | D | E | F |
|---|---|---|---|---|---|---|
| Flow rate setting | 2 | 5 | 10 | 2 | 5 | 10 |
| Nebulization rate setting | 5 | 5 | 5 | 10 | 10 | 10 |

Results for the first setup configuration show that APP treatment with acrylic acid increases IFSS in RFL matrix by about 60% at the longest residence time. APP treatment with acrylic acid increases IFSS in PU matrix by about 45% at the longest residence time. Other precursors also increase adhesion, but not as much. Use of the mesh seems to result in slightly lower IFSS than without the mesh.

One reason to use the first setup with nebulizer is to generate 'soft-polymerized' plasma coatings with more retention of functional groups in the precursor. The precursors used in this setup should have low viscosity or small molecular weight to be nebulized. It should be noted also that precursors used in this first setup may not satisfy the requirements of the second setup below (such as being low-boiling). But the precursors used in the second setup below could be used in this first setup since aerosol formation using ultrasound does not require high temperatures.

Figure 6:
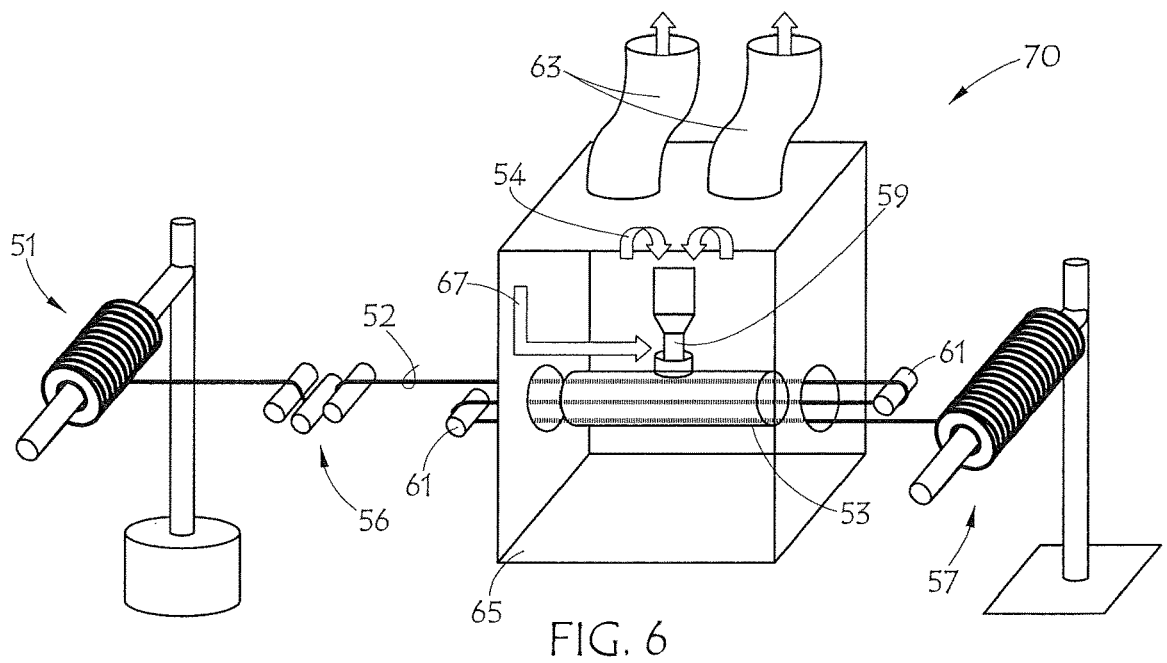
FIG. 6 is a schematic representing a second setup for APP treatment of carbon fiber.

Methodology and Results for a Second APP Setup Configuration:

In the second configuration, shown in FIG. 6, the basic setup condition listed in Table 6 was used and the various parameter variations and results are presented in Tables 4 and 5. In the second APP setup 70 shown in FIG. 6, the APP was performed on un-sized PAN-based carbon fibers in an Openair® plasma technology system (Upgraded Plasma polymerization unit with Jet PFW10-PAD; Plasmatreat®, Steinhagen, Germany). This system was operated with a power of 2.1 kW (V=296±3V, I=7±0.2 A) and excitation frequency between 15-25 kHz. Nitrogen ($N_2$) and air (BOC, UK) were used as ionization gas 54 and carrier gas 67 with flow rates of 2,000 L/h and 300 L/h, respectively. Acrylonitrile (AN) and TEMDA, and HMDSO were used as the precursor. The continuous fiber surface treatment was performed using afterglow (remote mode) plasma. The precursor was supplied at a constant dosing rate, heated to 80° C. to vaporize and carried by a constant air flow directly into the afterglow atmospheric plasma zone. Due to health and safety precautions, the whole plasma zone was housed in a sealed acrylic box 65, with extractors 63. The pre-tensioned (150 g force) carbon fiber roving 52 was positioned 15 mm from the tip of the plasma jet 59, inside a 250 mm long borosilicate glass unequal tee-piece 53 (PTU100/25, QVF Process System Ltd, Stafford, UK). As in the first setup, the carbon fibers 52 were supplied from let off 51, through glass chamber 53. The fibers were tensioned by pre-tensioning device 56 and wound on take-up winding unit 57. The atmospheric plasma treatment of carbon fibers in a semi-enclosed system advantageously generates a more confined environment and, therefore, is believed to be more effective. The configuration (FIG. 6) allowed for the continuous exposure of both sides of the carbon fiber roving to the plasma jet by redirecting the carbon fibers by means of phenolic resin roller pins 61, which allowed them to be looped through the reaction chamber 53 three times to maximize the exposure to the APP treatment zone. The APP treatment times and precursor dosing rates were varied. Three different treatment process speeds (0.18, 0.8, and 1.4 m/min) were chosen in order to adjust the residence times (4.2, 0.9, and 0.5 minutes, respectively) within the active afterglow plasma zone inside the glass chamber. To investigate the effect of the AN precursor dosing rates, 0 g/h was used at line speed of 3 mm/s as a control group, whereas 50 g/h, 100 g/h, 150 g/h were used at a line speed of 23 mm/s. Stainless steel mesh could optionally be inserted in the plasma chamber like the mesh 58 in FIG. 5.

Table 4 shows apparent interfacial shear strength and other results for various treated carbon fibers and RFL matrix. The variables used in Table 4 are also described in S. Bai, K. K. C. Ho, G. Knox, A. Bismarck, "Impact Of Continuous Atmospheric Pressure Plasma Polymerization Of Acrylic Acid On The Interfacial Properties Of Carbon Fibre—RFL Elastomer Composites," a paper presented at ECCM15 —15TH EUROPEAN CONFERENCE ON COMPOSITE MATERIALS, Venice, Italy, 24-28 Jun. 2012, which is incorporated herein by reference. Note that in Table 4, the $\sigma_0$ and $\sigma_f$ values of Ex. 26-29 are assumed to be the same as the measured values for Ex. 25, Ex. 24 the same as Ex. 1, and Ex. 34-36 the same as Ex. 33. Also, in Table 4, AN signifies use of acrylonitrile as the precursor for the polymer coating on the fiber. Likewise, TEMDA signifies tetramethylethylenediamine, and HMDSO signifies hexamethyldisiloxane.

The results in Table 4 for RFL matrix are not quite as favorable as those shown in Table 1 above (32% improvement in IFSS). This is attributed to the precursors used not being quite as compatible with the RFL matrix. One of skill in the art should be able to select a suitable precursor for the desired matrix based on the disclosure herein and minimal experimentation.

Table 5 shows some additional interfacial shear strength test results for treated carbon fiber adhesion to cast polyurethane elastomer matrix. Also, in Table 5, "AN" signifies use of acrylonitrile as the precursor for the polymer coating on the fiber. Likewise, "PAA" signifies the use of acrylic acid precursor. "ACN" signifies use of acetonitrile as the precursor. The APP setup was the same as in Table 4, except some used nitrogen as the carrier gas. Here the AN precursor results in significant improvements (+22%) in adhesion over untreated fiber or over plasma treatment with no precursor. In addition, it can be seen that the AN precursor results in comparable or somewhat better adhesion to cast PU than the commercial sizing available on the carbon fiber (generally believed to be epoxy-based). The PAA precursor gave better results than the AN.

It is also noted that applying the polymer coating by the APP process over a commercial sizing generally is not a preferred method. Sizing can be removed by washing or solvent stripping, for example. Unsized or de-sized carbon fiber is generally preferable for use in the APP process described herein.

The reported values of $\tau_{IFSS}$ in Table 4 also vary somewhat from the values reported in the priority application due to remeasurement of the fiber strength, $\sigma_f$, which is used to calculate the IFSS as described below. The conclusions remain the same. The bulk properties of the continuous APP treated fibers were not affected with no loss of tensile strength or modulus. Micromechanical characterization of adhesion behavior between carbon fibers and elastomeric matrix RFL showed significant improvement by around 60% with the longest treatment time by using acrylic acid as precursor. The increased wettability can induce better adhesion, but the mechanical properties of deposited polymer were crucial for IFSS. The shorter resident time in plasma can lead to more carboxylate existing on the fiber surface, but it can also lead to lower mechanical properties of deposited polymers, which resulted in lower IFSS. The using of stainless steel mesh increased the content of carboxylate, and also leads to a different physical structure of deposited polymer layer, which induced a slightly lower IFSS compared to without using mesh.

Ageing tests were carried out to determine the effect of ambient air on the shelf life of APP treated carbon fibers (Ex. 33-36). After ageing, by storing the fibers in ambient atmosphere, for one month, the unsaturated radicals or active surface sites (such as imine and hydrogen bonded and protonated amino group) present in the plasma coating reacted with oxygen and/or with moisture in the air, which resulted in an increase in the surface oxygen and reduction in the nitrogen content. A reduction of amine/imine groups and increase of amide groups with increasing ageing time was also observed. In addition, storage of plasma treated polymers in ambient air initially resulted in the hydrolysis of imine groups by moisture in the air, which would eventually lead to the incorporation of nitrogen in to the polymer. This may result in a loss of nitrogen-containing fragments from the plasma polymer, which is consistent with the reduction of the nitrogen content of aged APP treated AS4D carbon fiber. Hydrolysis and oxidation of the plasma polymer may reduce the possibility of bonds forming between the plasma polymer layer deposited onto carbon fibers and RFL, hence reducing the apparent IFSS. Meanwhile, since there is no substantial decrease in the surface density of functional groups as observed in the high resolution XP spectra, it shows that the reorientation of polar moieties away from the surface into the subsurface of the plasma polymer layer did not occur. This might be due to the high crosslink density of the plasma polymer coating formed, which restricted any surface restructuring.

TABLE 4

| Ex. | Fibers | m | $\sigma_0$ (MPa) | $\sigma_f$ (MPa) | $d_f$ (μm) | l (μm) | $l_c$ (μm) | $\tau_{IFSS}$ (MPa) |
|---|---|---|---|---|---|---|---|---|
| 1 | Type A-unsized Untreated | 5.86[a] | 7338[a] | 6767 | 7.1 ± 0.1 | 770 ± 14 | 1027 ± 18 | 23.4 ± 0.4 |
| 24 | Type A- N$_2$ atmos.-no precursor-0.18 m/min | 5.86[b] | 7338[b] | 6797 | 7.1 ± 0.1 | 838 | 1117 ± 33 | 21.6 ± 0.6 |
| 25 | Type A-unsized-(RFL) AN-0.18 m/min-50 g/h | 5.09[d] | 8209[d] | 7742 | 7.0 ± 0.1 | 658 ± 14 | 877 ± 18 | 30.9 ± 0.5 |
| 26 | Type A-unsized-(RFL) AN-0.8 m/min-50 g/h | 5.09[e] | 8209[e] | 7549 | 7.1 ± 0.1 | 748 ± 16 | 997 ± 22 | 26.7 ± 0.5 |
| 27 | Type A-unsized-(RFL) AN-1.4 m/min-50 g/h | 5.09[e] | 8209[e] | 7593 | 7.0 ± 0.1 | 726 ± 14 | 968 ± 19 | 27.5 ± 0.4 |
| 28 | Type A-unsized-(RFL) AN-1.4 m/min-100 g/h | 5.09[e] | 8209[e] | 7530 | 7.0 ± 0.1 | 757 ± 26 | 1010 ± 35 | 26.1 ± 0.7 |
| 29 | Type A-unsized-(RFL) AN-1.4 m/min-150 g/h | 5.09[e] | 8209[e] | 7379 | 7.0 ± 0.1 | 840 ± 25 | 1120 ± 33 | 23.1 ± 0.6 |
| 30 | Type A-unsized-(RFL) TEMDA-8 cm/min-50 g/h | 6.06 | 8030 | 7480 | 7.0 ± 0.1 | 734 ± 17 | 979 ± 22 | 26.7 ± 0.5 |
| 31 | Type A-unsized-(RFL) HMDSO-8 cm/min-50 g/h | 6.31 | 6542 | 6028 | 7.4 ± 0.1 | 797 ± 26 | 1063 ± 3 | 20.9 ± 0.7 |
| 32 | Type C-untreated | 7.08 | 6932 | 6598 | 6.9 ± 0.1 | 666 | 888 ± 20 | 25.4 ± 0.6 |
| 33 | Type C-AN-0.18 m/min-50 g/h | 7.32[f] | 7063[f] | 6920 | 6.8 ± 0.1 | 544 | 725 ± 20 | 32.5 ± 0.9 |
| 34 | Ex. 31-1 week aging | 7.32[g] | 7063[g] | 6909 | 6.8 ± 0.1 | 550 | 733 ± 15 | 32.1 ± 0.7 |
| 35 | Ex. 31-1 month aging | 7.32[g] | 7063[g] | 6846 | 6.8 ± 0.1 | 588 | 784 ± 18 | 29.7 ± 0.7 |
| 36 | Ex. 31-3 months aging | 7.32[g] | 7063[g] | 6824 | 6.8 ± 0.1 | 602 | 803 ± 19 | 28.9 ± 0.7 |

[b] is assumed the same as [a]; [e] is assumed the same as [d]; [g] is assumed the same as [f].

TABLE 5

| Ex. | Treatment | | $\tau_{IFSS}$ (Mpa) (LF940A PU) |
|---|---|---|---|
| 37 | Type A- | Untreated | 20.1 ± 3.0 |
| 38 | unsized | AN-0.08 m/min-50 g/h | 39.9 ± 1.5 |
| 39 | | 0.08 m/min (without precursor) | 32.7 ± 2.0 |
| 40 | | PAA-0.18 m/min-No mesh | 43.0 ± 1.0 |
| 41 | | PAA-0.18 m/min-with mesh | 41.5 ± 1.4 |
| 42 | | AN_N2 + Air_0.8 m/min, 50 g/h | 31.9 ± 1.2 |
| 43 | | AN_N2 + Air_1.4 m/min, 50 g/h | 33.8 ± 1.2 |
| 44 | | AN_N2 + Air_1.4 m/min, 150 g/h | 30.9 ± 1.1 |
| 45 | | TMEDA_Air_0.08 m/min, 50 g/h | 28.4 ± 1.2 |
| 46 | | HMDSO_N2 + N2_0.08 m/min, 50 g/h | 15.8 ± 1.1 |
| 47 | | AN_N2 + N2_0.08 m/min, 50 g/h | 34.4 ± 2.9 |
| 48 | | ACN_N2 + N2_0.08 m/min, 50 g/h | 33.2 ± 1.6 |
| 49 | Type A | Untreated | 46.5 ± 2.9 |
| 50 | sized | AN-0.08 m/min-50 g/h | 51.6 ± 2.9 |
| 51 | Type B- | Untreated | 32.4 ± 3.7 |
| 52 | sized | AN-0.08 m/min-50 g/h | 41.7 ± 1.4 |
| 53 | | PAA-0.18 m/min-No mesh | 46.4 ± 1.5 |

TABLE 6

| APP treatment parameters | |
|---|---|
| Flow of Ionized Gas - N$_2$ (L/h) | 2000 |
| Flow of carrier gas - Air (L/h) | 300 |
| Precursor dosage rate (g/h) | 50, 100, 150 |
| Power Input (kW) | 2.1 |
| Stand Off Distance (mm) | 12 |
| Primary Pressure (Bar) | 6 |
| Processing speed (m/min) | 0.18, 0.8, 1.4 |
| Plasma excitation frequency | 15-25 kHz |

It may be noted that the second setup has some restrictions as to the precursor choice, such as boiling point less than 150° C. and being non-corrosive due to equipment limitations.

Single Fiber Fragmentation Test Methodology (Used for RFL Matrix):

The RFL represents a high strain, around 850%, elastomeric matrix and was used in this study. This specific physical property (high strain) of RFL limited other technical methods, such as single fiber pull out test, to characterize the adhesion between RFL and carbon fibers. However, it can be solved by using the fragmentation test due to the much lower strain of carbon fibers than RFL and transparency of RFL matrix. The specimens were made by a solvent evaporation method. Single fibers were attached at both ends to glass slides which has defined ends thicknesses of approximately 100 µm by transparent tape. Therefore, the fibers were kept away from the glass slide surfaces and positioned in the center of the eventual polymer specimens. A solution of 25 wt. % of RFL was cast onto the glass slides, covering the fibers completely. The films were first dried for 1 h on a level hot press at temperature of 70° C., and then cured for 30 minutes at 170° C. in a vacuum oven to remove any traces of solvent. Dumb-bell shaped specimens were then cut using the Zwick D-7900 cutting device (Zwick Roell Group) and tested on the TST 350 tensile stress testing system (Linkam Scientific Instrument Ltd.). The dimensions of the tested specimens at gauge length region were about 200 µm thick, 4 mm wide and 30 mm long. Elongating the specimens in a tensile tester results in fiber breakage. The fiber inside the resin breaks into increasingly smaller fragments at locations where the fiber's axial stress reaches its tensile strength. When the fiber breaks, the tensile stress at the fracture location reduces to zero. Due to the constant shear in the matrix, the tensile stress in the fiber increases roughly linearly from its ends to a plateau in longer fragments. The higher the axial strain, the more fractures will be caused in the fiber, but at some level the number of fragments will become constant as the fragment length is too short to transfer enough stresses into the fiber to cause further breakage. Therefore, during the tensile tests, the specimens were strained up to 80% to ensure crack saturation at a crosshead speed of 15 µm/s, as at 80% strain the force-strain curve of RFL was start to become subdued. The entire single fiber fragmentation process was monitored using a polarized light microscope (Wild Heerbrugg). At least ten specimens were tested for each type of fiber. The fiber fragment lengths were measured under an Olympus BX51 M reflected light optical microscope using an Olympus DP70 camera system, calibrated by a glass scale (10 mm stage micrometer scale, 0.1 mm divisions, Graticules Ltd.). The apparent interfacial shear strength between fibers and RFL matrix was estimated from the Kelly-Tyson model [1] and fitting the Weibull distribution to predict the fiber tensile strength at the critical fragment length.

$$\tau_{IFSS} = \frac{\sigma_f d_f}{2l_c} \quad (1)$$

$$l_c = \frac{4}{3}l \quad (2)$$

where $\sigma_f$ is the fiber strength at the critical fragment length, $d_f$ is the fiber diameter, $l_c$ is the critical fragment length of the fiber, which can be obtained from the mean fiber fragment length l at saturation [2]. In Table 4, m and $\sigma_o$ are the Weibull parameters, i.e. the Weibull modulus and Weibull strength, respectively.

Single fiber pull-out test methodology (used for PU matrix):

Micromechanical tests such as single fiber pull-out test are very important for the characterisation of the adhesion quality between the fiber and the matrix in composite materials. In this technique a single fiber is embedded a short distance in a matrix block. The adhesion strength is then calculated from the force required to pull out the fiber divided by the embedded area of fiber in the matrix (FIG. 7).

Despite the drawbacks originated mainly from the complex stress-state in test samples and the existence of many processes which can occur parallel to debonding, such as interfacial friction, matrix yielding or cohesive failure [3], the micromechanical tests remain the only experimental tool for direct measurement of the interfacial bond strength and can be used with both brittle and ductile matrices [4]. What is worth mentioning is that the results may be difficult to interpret due to the cohesive failure. That is the failure induced during the test may be not at the interface but in the reinforcement or in the matrix. The situation is further complicated if an interfacial layer of material C has formed between reinforcement A and matrix B. In this situation there are two interfaces at which it is possible to have adhesive failure, namely at A-C and C-B, and three materials (A, B and C) which could fail cohesively. However, practically, provided it is possible to ensure that the testing conditions reproduce the service conditions, it does not matter whether failure during testing is adhesive or cohesive as long as the strength of the 'weak link' at the interface is being measured [3]. Therefore, single fiber pull-out tests were performed to determine the effect of atmospheric plasma polymerisation on the apparent interfacial shear strength ($t_{fss}$,) which was used as a measure of the practical adhesion between the treated fiber and the elastomers.

Figure 7:
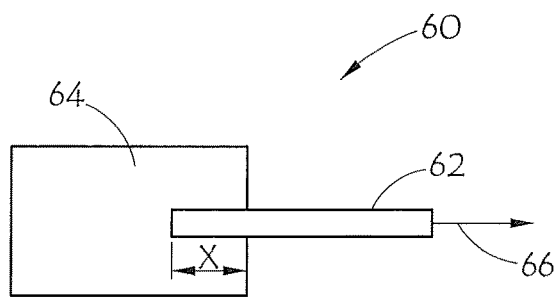
FIG. 7 is a schematic representing a fiber pull out adhesion test.

FIG. 7 is a schematic illustration of single-fiber pull-out test 60. Fiber 62 is embedded in matrix 64 a distance X and pulled out by applying parallel force 66.

Figure 8:
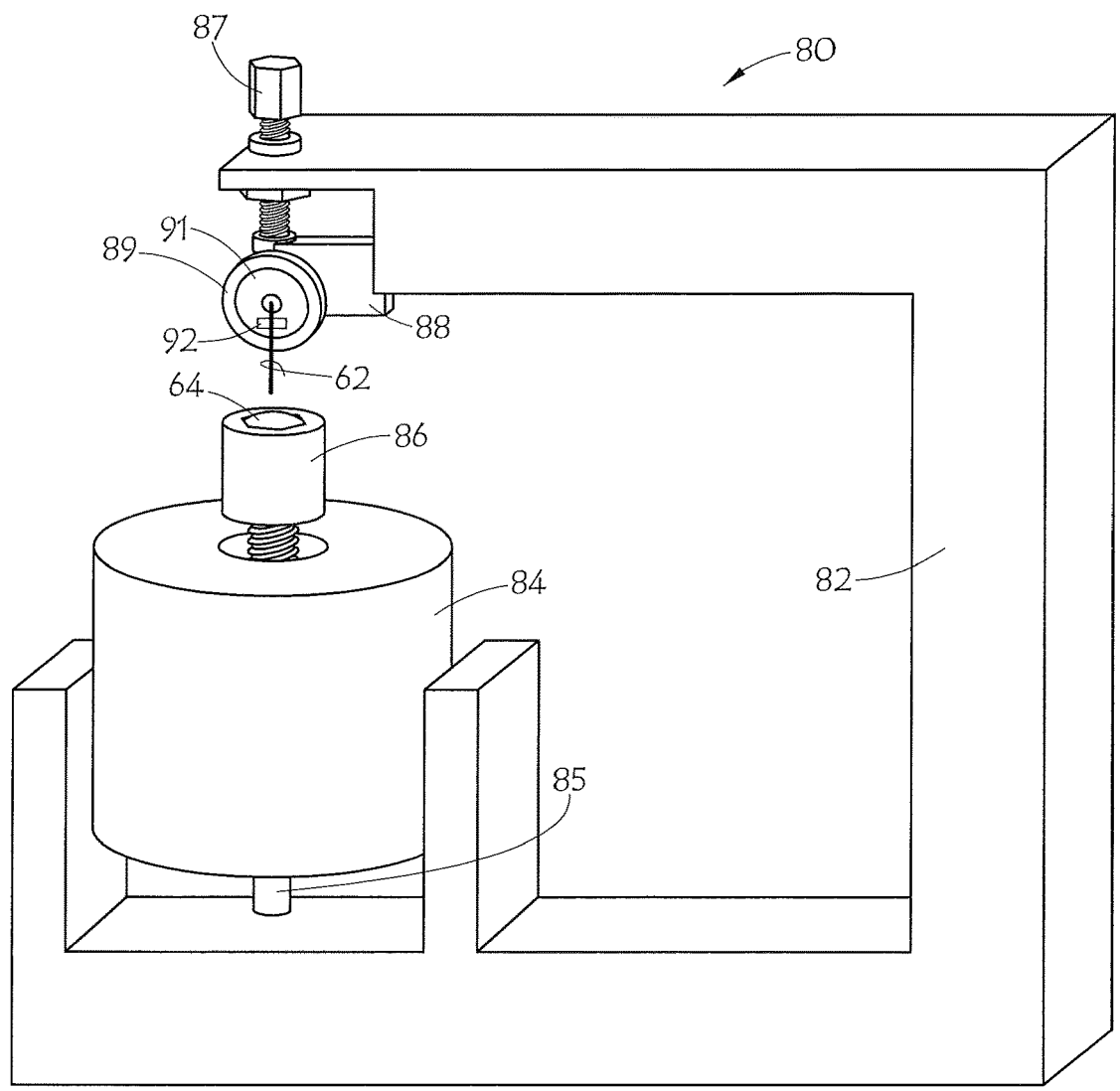
FIG. 8 is a schematic representing a fiber embedding apparatus.

Single-fiber pull-out tests were performed using single-fiber pull-out specimens prepared with embedding device 80 shown schematically in FIG. 8, (not to scale). In FIG. 8, fiber sample 62 is fixed onto metal washer 91 with a piece of double sided adhesive tape 92. Fiber 62 preferably extends beyond the edge of washer 91 about 5 mm. Washer 91 is held by magnet 89 on sliding head 88 which can be slid downward by turning screw 87. Screw 87 has a very fine thread, e.g. one turn moved head 88 about 300 μm in this case. Sliding head 88 is mounted on frame 82. Frame 82 also holds heater 84 which is used to melt and/or cure polymer matrix material 64 in the hex socket of hex screw 86. Hex screw 86 may be raised out of and lowered into the heater using glass rod 85.

Thus, a single fiber was partially embedded in polymer melt (PU in this case) with depth of embedding between 60 to 100 μm for carbon fiber. Since the pot life of the PU polymer, a mixture of Adiprene LF 940A and Vibracure A157, was just 5 minutes, the whole embedding process was finished during this period, then the samples left in the furnace of the embedding device to cure for 30 minutes at 100° C., and finally, the samples were transferred to a post-cure oven at 100° C. for 24 hrs.

After post-curing, the samples were prepared for the pull-out device (tensiometer) by cutting the fiber at the washer and gluing a needle onto the fiber using cyanoacrylate adhesive (Industrial Grade Superglue, Everbuild Building Products Ltd, Leeds, UK). The fiber was then pulled from the matrix as shown in FIG. 7 by mounting the hex screw on one end of the tensiometer and the needle on the other end. Then the fiber was loaded at a speed of 1 μm/s and pulled out of the matrix while the force versus displacement was recorded throughout the experiment by a load cell and logged using a computer.

The apparent interfacial shear strength $\tau_{IFSS}$ can be calculated from the $F_{max}$ required to start the debonding of the embedded carbon fiber from the matrix using the following equation:

$$\tau_{IFSS} = \frac{F_{max}}{\pi d_f L} \quad (3)$$

Where $d_f$ is the diameter of the fiber (determined by the modified Wilhelmy method) and L is the embedded fiber length. The apparent shear strength between plasma treated/untreated carbon fibers and matrices was determined from at least 6 measurements in order to obtain a statistically significant average, and the presented values were averaged with standard errors.

References (for the Methodology):

[1] A. Kelly and W. R. Tyson, "Tensile properties of fiber-reinforced metals: Copper/tungsten and copper/molybdenum," *Journal of the Mechanics and Physics of Solids*, vol. 13, pp. 329-338, inl-in2, 339-350, 1965.

[2] T. Ohsawa, et al., "Temperature dependence of critical fiber length for glass fiber-reinforced thermosetting resins," *Journal of Applied Polymer Science*. vol. 22, pp. 3203-3212, 1978.

[3] F.L.Matthews and R.D.Rawlings, *Composite Material: Engineering and Science*, 1999.

[4] L.S.Penn, *Handbook of Polymer-Fiber Composites:* Longman Scientific & Technical, 1994.

Applications:

The following describes applications of the inventive carbon fiber tensile cord as reinforcement in rubber products according to various embodiments of the invention.

Figure 2:
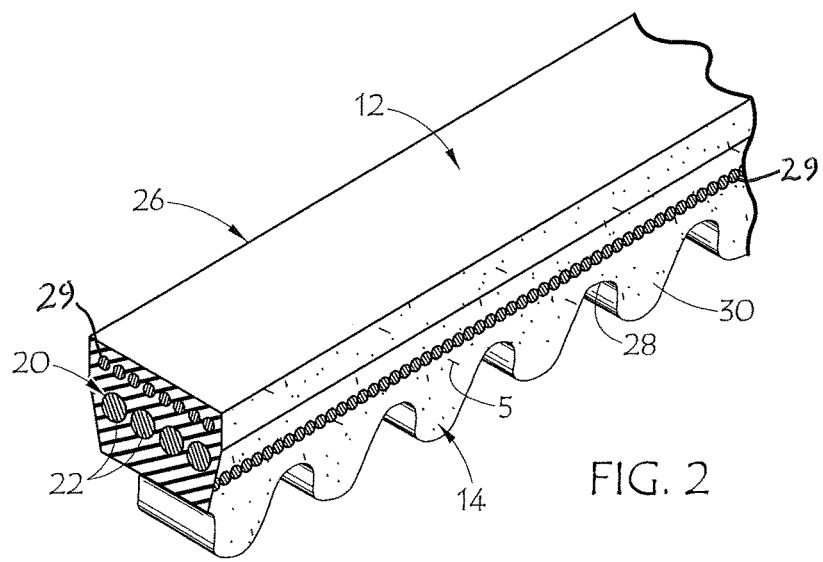
FIG. 2 is a partially fragmented perspective view of a portion of a V-belt constructed in accordance with an embodiment of the present invention.
Figure 3:
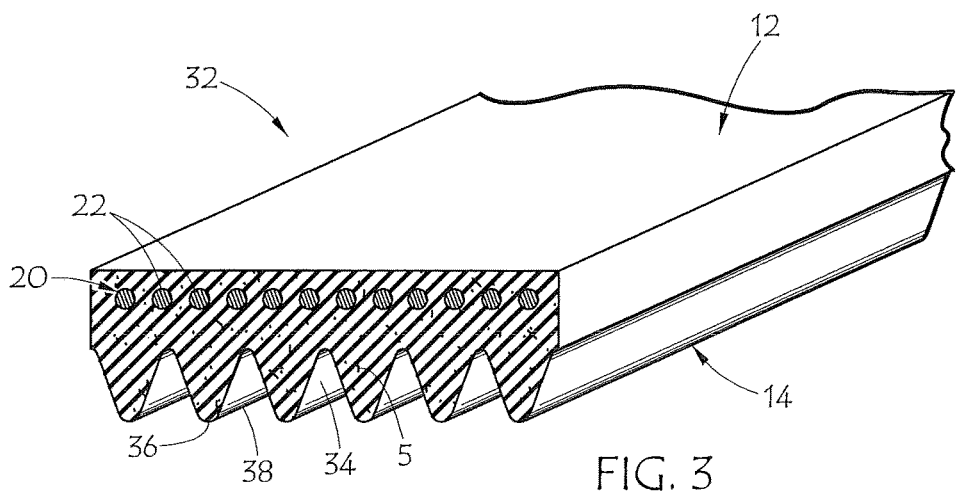
FIG. 3 is a partially fragmented perspective view of a portion of a synchronous belt constructed in accordance with an embodiment of the present invention.

As for the belt embodiments of the invention, three are illustrated in FIGS. 1-3. Referring to FIG. 1, a toothed belt 10 is illustrated. Referring to FIG. 1, a toothed belt 10 in accordance with an embodiment of the present invention is shown generally. The toothed belt 10 includes an elastomeric main belt body portion 12, and a sheave contact portion 14 positioned along the inner periphery of the main belt body portion 12. The word "sheave" as used in this context includes conventional pulleys and sprockets used with a power transmission belt, and also rollers and like mechanisms. The particular sheave contact portion 14 of the belt of FIG. 1 is in the form of a plurality of alternating teeth 16 and land portions 18. The sheave contact portion 14 is integral with the main belt body portion 12 and may be formed from the same elastomeric material(s) as described below. The sheave contact portion 14 can be seen to comprise a reinforcing fabric 24, explained in further detail below, as conventionally utilized in synchronous belt building configurations, and is thus formed of a material other than that of the main belt body portion 12 in that embodiment of the present invention. Any of the elastomer materials may contain short fibers 5 dispersed therein, which also may be provided in accord with the fibers of the present invention, i.e., a chopped cord treated with atmospheric plasma polymerized precursor, preferably a carbon fiber cord.

The tensile or load-carrying cord section 20 is positioned above the undercord 16 for providing support and tensile strength to the belt 10. In the illustrated form the tensile section comprises at least one longitudinally extending tensile cord 22, the tensile cord being in accord with an embodiment of the invention as described in further detail herein, i.e., a cord treated with atmospheric plasma polymerized precursor, preferably a carbon fiber cord, aligned along the length of the belt, and in accordance with various embodiments of the present invention, is at least partially in contact with or is embedded in an adhesive rubber member such as an RFL, polyurethane material, rubber cement, or the like. The skilled practitioner would readily appreciate that the adhesive rubber member may be visually indistinguishable from the surrounding elastomeric belt body portion. The adhesive rubber member may actually be of the same material as the elastomeric main belt body 12.

Referring to FIG. 2, a standard notched V-belt 26 is illustrated. The V-belt 26 includes a main elastomeric belt body portion 12 similar to that illustrated in FIG. 1, and a tensile or load-carrying section 20 in the form of one or more tensile cords 22, which may be embedded in an optional adhesive rubber member (not shown), and which cords 22 are advantageously made in accord with an embodiment of the invention as described in further detail herein, i.e., a cord treated with atmospheric plasma polymerized precursor, preferably a carbon fiber cord. The main elastomeric belt body portion 12, adhesive rubber member and load-carrying section 20 of the V-belt 26 may be constructed from the same materials as described above for FIG. 1. In particular, the elastomers may be loaded with short fiber 5, made from chopped APP-treated cord, preferably of carbon fiber. These fibers 5 may be exposed at sheave contact portion 14. The side surfaces of the elastomeric main belt body portion 12, or in the case of a V-belt as illustrated, of the compression section, serve as the driving surfaces of the belt 26. In the embodiment illustrated, the sheave contact portion 14 is in the form of alternating notch depression surfaces or troughs 28 and toothed projections 30. These alternating depression surfaces 28 and projections 30 may preferably follow a generally sinusoidal path as illustrated which serves to distribute and minimize bending stresses as the sheave contact portion 14 passes around pulleys during operation.

A reinforcing fabric (not shown in FIG. 2 or 3) may optionally be utilized and in the case of V-belts and multi-V-ribbed belts intimately fits along the surface of the belt opposite the sheave contact portion 14 to form a face cover or overcord for the belt, or may be embedded in the belt body. The fabric may be of any desired configuration such as a conventional weave consisting of warp and weft threads at any desired angle, or may consist of warp threads held together by spaced pick cords as exemplified by tire cord fabric, or of a knitted or braided configuration, or of a nonwoven configuration, or paper, or plastic film, and the like. The fabric may be friction- or skim-coated with the same or different elastomer composition as that of the elastomeric main belt body 12. More than one ply of fabric may be employed. If desired, the fabric may be cut or otherwise formed to be arranged on a bias so that the strands form an angle with the direction of travel of the belt. One embodiment of such reinforcing fabric use is shown in FIG. 2 wherein a rubber-skim coated tire cord fabric 29, is illustrated in exaggerated form embedded in the undercord and also in the overcord portion. The cord of the cord fabric 29 may be according to an embodiment of the inventive cord described herein, i.e., a cord treated with atmospheric plasma polymerized precursor, preferably a carbon fiber cord. Usage of nonwoven or paper materials is described for example in U.S. Pat. No. 6,793,599 to Patterson et al., and the contents of that patent with respect to same are incorporated herein by reference. Usage of plastic film is described for example in U.S. Pat. Application Publication No. 20020187869, and the contents of that publication with respect to same are incorporated herein by reference.

While in the illustrated embodiment, the V-belt 26 is in the form of a raw-edged belt, a reinforcing fabric as described above may moreover be employed, either as a face cover or overcord for the belt as shown, or fully encompassing the belt to form a banded V-belt.

Referring to FIG. 3, multi-V-ribbed belt 32 is illustrated. The ribbed belt 32 includes a main elastomeric belt body portion 12 and sheave contact portion 14 as in the case of the belts of FIGS. 1 and 2, and also includes a load-carrying section 20 with the inventive cords 20 as previously described for the belts of FIGS. 1 and 2. For the ribbed belt 32 however, the sheave contact portion 14 is in the form of longitudinally extending ribs 36 and trough portions 34. The multi-V-ribbed belt 32 includes an elastomeric main belt body portion 12, and a sheave contact portion 14 positioned along the inner periphery of the main belt body portion 12. The particular sheave contact portion 14 of the belt of FIG. 3 is in the form of a plurality of ribs comprising raised areas or apexes 36 alternating with a plurality of trough areas 34 defining there between oppositely facing sides. In each of the instances of FIGS. 2-3, the sheave contact portion 14 is integral with the main belt body portion 12 and may be formed from the same elastomeric material(s) as described below. The sheave contact portion 14 may comprise a reinforcing fabric over ribs 38. The ribbed belt 32 may optionally include a tire cord fabric as in FIG. 2, which may comprise cord that is APP treated according to the present invention. The ribbed belt 32 may also include chopped fiber 5 as described for the belts of FIGS. 1 and 2.

Figure 4:
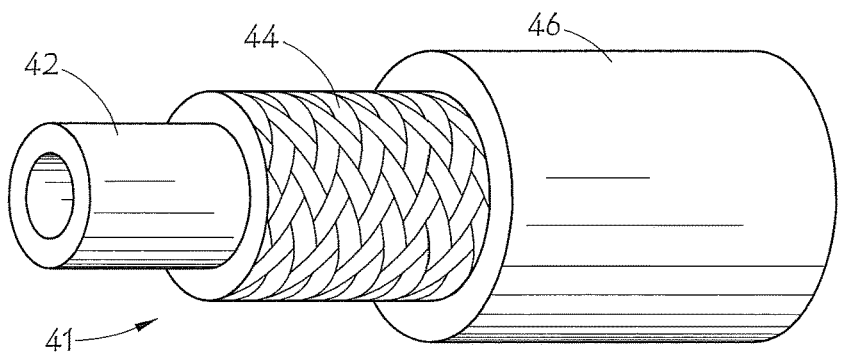
FIG. 4 is a partially fragmented perspective view of a portion of a hose constructed in accordance with an embodiment of the present invention.

Referring to FIG. 4, a hose 41 constructed according to one embodiment of the present invention is shown. The hose 41 comprises an elastomeric inner tube 42, a reinforcement member 44 telescoped over and preferably adhered to the inner tube 42, and an elastomeric outer cover 46 telescoped over and preferably adhered to the reinforcement member 44. The reinforcement member 44 may be formed of a suitable APP-treated carbon fiber reinforcement according to an embodiment of the invention. The reinforcement construction may be of any suitable type such as braid, spiral, knit or wrapped, but in the embodiment shown, is of a braid construction.

The inner tube 42 may consist of multiple elastomeric or plastic layers which may or may not be of the same composition as each other. The elastomeric outer cover 46 is made of suitable materials designed to withstand the exterior environment encountered. The inner tube 12 and the outer cover 16 may be made of the same material. The hose 41 may be formed by molding or extrusion. The elastomer may be reinforced with chopped fiber according to the present invention.

In each of the cases of FIGS. 1-4 shown above, the main belt body portion 12 or hose inner tube 42 or outer cover 46 may be formed of any conventional and/or suitable cured elastomer composition, and may be reinforced with chopped APP-treated carbon fiber 5 according to an embodiment of the invention. Suitable elastomers that may be utilized for this purpose include for example polyurethane elastomers (including as well polyurethane/urea elastomers) (PU), polychloroprene rubber (CR), acrylonitrile butadiene rubber (NBR), hydrogenated NBR (FINER), styrene-butadiene rubber (SBR), alkylated chlorosulfonated polyethylene (ACSM), chlorosulfonated polyethylene (CSM), chlorinated polyethylene (CPE), epichlorohydrin (ECO), polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); ethylene vinylacetate elastomers (EVM); ethylene methylacrylate (EAM); and silicone rubber, or a combination of any two or more of the foregoing.

To form the elastomeric composition in accordance with an embodiment of the present invention, the elastomer(s) may be blended with conventional rubber compounding ingredients including fillers, plasticizers, stabilizers, vulcanization agents/curatives and accelerators, in amounts conventionally employed. For example, for use with ethylene-alpha-olefin elastomer and diene elastomers such as HNBR, one or more metal salts of alpha-beta organic acids may be employed in amounts now conventionally utilized to improve dynamic performance of the resultant article. Thus zinc dimethacrylate and/or zinc diacrylate may be utilized in such compositions in amounts of from about 1 to about 50 phr; or alternatively of from about 5 to about 30 phr; or of from about 10 to about 25 phr. These materials furthermore contribute to the adhesiveness of the composition, and increase the overall cross-link density of the polymer upon curing with peroxide or related agents through ionic cross-linking, as is now well known in the art.

One skilled in the relevant art would readily appreciate any number of suitable compositions for utilization in or as the elastomeric portions of the belt. A number of suitable elastomer compositions are described for example in The R. T. Vanderbilt Rubber Handbook (13$^{th}$ ed., 1996), and with respect to EPM or EPDM compositions and such compositions having particular high tensile modulus properties, are furthermore set forth in U.S. Pat. Nos. 5,610,217, and 6,616,558 respectively, the contents of which, with respect to various elastomer compositions that may be suitable for use in the formation of power transmission belt body portions, are specifically incorporated herein by reference. In addition, with respect to several cast PU compositions that may also be utilized in the practice of various embodiments of the present invention, such compositions are described for example in WO 09692584 to Wu et al., and the contents of that international patent application with respect to same are incorporated herein by reference.

In an embodiment of the present invention associated with automotive accessory drive applications, the elastomeric belt body portions 12 may be formed of a suitable ethylene alpha olefin composition, such as an EPM, EPDM, EBM or EOM composition, which may be the same or different composition as that employed as the adhesive rubber member composition. HNBR is particularly useful for synchronous belts. For hose, CR, NBR, CPE, PVC, EPDM, and the like are commonly used.

The cured elastomeric composition may moreover be loaded with discontinuous fibers as is well known in the art, utilizing materials such as including but not limited to cotton, polyester, fiberglass, aramid and nylon, in such forms as staple- or chopped fibers, flock or pulp, in amounts generally employed, but preferably using chopped APP-treated carbon fiber as described herein. In a preferred embodiment relating to profiled (e.g., as by cutting or grinding) multi-v-ribbed belts, such fiber loading is preferably formed and arranged such that a substantial portion of the fibers are formed and arranged to lay in a direction generally transverse the direction of travel of the belt. In molded multi-v-ribbed belts and/or synchronous belts made according to flow through methods however, the fiber loading would generally lack the same degree of orientation.

In accordance with one embodiment of the present invention, the cured elastomer composition for utilization in at least partial contact with the load carrier cord within the composite belt structure as described in several embodiments above for FIGS. 1-4 may optionally include the features and benefits thereof described in detail in aforementioned U.S. Pat. No. 6,616,558, the contents of which have been incorporated herein by reference.

In operation, the belt, as shown for example in FIGS. 1-3, is generally trained about at least one driver pulley and one driven pulley to form a belt drive, optionally in combination with an idler pulley. Likewise a hose as shown in FIG. 4 is generally used with any of a number of end couplings, clamps, or fittings or in a hose system.

Use of cords in tires is well-known. The inventive cords may be advantageously used to reinforce tires and other rubber products as well as hose and belts. Belts includes power transmission belts, such as toothed synchronous belts, V-belts, flat belts, multi-v-ribbed belts and the like, conveyor belts, transfer or transport belts, and the like. Hoses includes hydraulic hose, transfer hose, and the like.

Two belt examples were constructed using some of the cord examples described above. The belts were toothed belts as illustrated in FIG. 1 with HNBR (hydrogenated nitrile-butadiene rubber) body elastomer and nylon fabric on the tooth surface. The cords from Ex. 1 and Ex. 25 were coated with RFL, then overcoated with a conventional overcoat cement and then made into the HNBR toothed belts. The belts were subjected to a cord pullout adhesion test for toothed belts. The results indicated that the APP-treated cord exhibited more rubber coverage on the pulled out cord than the untreated cord. The belts were also subjected to a tooth adhesion test for toothed belts. The results indicated that the APP-treated cord exhibited more rubber coverage after the tooth was sheared off the cord. It is believed such results indicate an improvement in integrity of the belt that will also show up in long duration dynamic testing (i.e. durability testing) of the belts. Likewise the improved adhesion of the treated cords to polyurethane indicate that cast polyurethane belting or thermoplastic polyurethane elastomer belting using the inventive treated cord will also exhibit improved belt performance.

APP-treated carbon fiber may be chopped into shorter lengths for use in reinforcing rubber or plastic compositions. The resulting short fiber may be dispersed in rubber or plastic compositions according to known methods of dispersion or mixing. The suitably chosen APP treatment may enhance the interfacial adhesion between short fiber and chosen matrix, thus enhancing the modulus, strength or other properties of the reinforced rubber or plastic composition. The APP-treated carbon fiber may be further treated, for example with RFL or other adhesive, for further compatibilizing with the rubber or plastic matrix.

In summary and conclusion, two different matrix systems were investigated for carbon fiber adhesion enhancement by APP: RFL and Polyurethane.

For RFL, acrylic acid used as precursor and deposited onto carbon fiber surface through the first setup, with the lowest processing speed, 0.18 m/min-without or with mesh, has the most promising IFSS (43.6 & 41.5 MPa). Usually, the maximum IFSS improvement was limited by the matrix shear yield strength, which is around 25 MPa for the RFL in this study. In other words, at 86% improvement of IFSS, the adhesion properties may have already reached the limit in RFL. According to the Kelly-Tyson model the values of IFSS should be close to matrix shear yield strength, however, which may not be the case here due to the differing mechanisms and doubts about the relevance of this model interpreting the fiber fragmentation data. Therefore, only adhesion between extremes of friction and matrix yielding can be determined by the fragmentation test. And the measured IFSS value represents a ceiling in load transfer ability between fiber and matrix in this carbon fiber/elastomer composites system.

Compared to using AN as precursor, plasma polymerization of acrylic acid can produce much more improvement of IFSS between carbon fiber and RFL. The use of stainless steel meshes in APP preserved much more carboxylic acid than without using mesh. However, with or without using mesh, both give good adhesion to RFL, though the surface chemistry of those two formed plasma polymers was completely different, which implies the formed hydrocarbon polymer together with acrylic acid can both enhance the IFSS between carbon fiber and RFL. Increasing the processing speed of APP of acrylic acid, resulted in more carboxylic acid retained in the plasma polymer, even more than fiber treated at lowest processing speed with mesh. However, it didn't give as good adhesion as the latter, which may due to poorer mechanical properties of formed plasma polymer affecting the load transfer at the interface. Therefore, to optimize the adhesion to RFL, plasma polymerization of acrylic acid with or without mesh running at the lowest processing speed may be preferred running conditions.

Beside unsized carbon fiber, we also treated sized carbon fiber T700GC-31E using AN through the second set-up.

However, it doesn't show the improvement of adhesion to RFL. This means the sizing has negative effect on APP treatment in the second set-up.

For polyurethane matrix, both set-ups with AN and acrylic acid were employed. The IFSS was measured through single fiber pull out test. For unsized T700GC-91 (Type A carbon fiber), APP of AN increased adhesion by 98%, and APP of acrylic acid gave even more enhancement up to 114%. APP of AN for sized T700GC-31E showed trace increase of 11%, which is similar to the RFL bonding system.

As for sized Toho carbon fiber (Type B), APP treatments using both AN and acrylic acid were conducted. They show 28% and 43% increases of IFSS in PU matrix after APP treatment with AN and acrylic, respectively. It implies the first set-up is more suitable for treatment of sized carbon fiber. The reason APP treated Toho using AN had better adhesion than T700GC-31E may be due to its higher amount of uncured epoxy sizing, which can react with fragments of precursor in the active plasma zone to form better bonding to plasma polymer. Therefore, different sizing systems can also have different influence on APP treatment.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A method comprising:
   treating a carbon fiber tensile cord with atmospheric plasma polymerization process wherein the carbon fiber tensile cord is fed continuously through an afterglow plasma zone consisting of ionized air or nitrogen, and wherein a precursor selected from the group consisting of hydroxy-alkyl esters of vinyl carboxylic acids is introduced to the afterglow plasma zone in the vicinity of the carbon fiber tensile cord;
   embedding the treated cord in an uncured elastomeric matrix; and
   curing the matrix with the embedded cord to form a reinforced elastomeric product.

2. The method of claim 1 wherein said precursor is in the form of an aerosol in a carrier gas when introduced to the plasma in the vicinity of the carbon fiber.

3. The method of claim 1 wherein the product is selected from the group consisting of a belt, a hose, and a tire.

4. The method of claim 2 wherein the stream introducing the precursor consists of the precursor in the carrier gas.

5. the method of claim 4 wherein the carrier gas is air.

6. A method comprising:
   treating a carbon fiber tensile cord with an atmospheric plasma polymerization process wherein the carbon fiber tensile cord is fed continuously through an afterglow plasma zone consisting of ionized air or ionized nitrogen, and wherein one or more precursor selected from the group consisting of lower molecule weight monomers with double bonds and containing hydroxyl functional groups that can be easily polymerized or crosslinked in the plasma is introduced to the afterglow plasma zone in the vicinity of the carbon fiber tensile cord, thus coating the carbon fiber of the tensile cord with a polymeric polymerized precursor layer deposited and polymerized at atmospheric pressure in the atmospheric plasma polymerization process;
   embedding the treated cord in an uncured elastomeric matrix; and
   curing the matrix with the embedded cord to form a reinforced elastomeric product.

7. The method of claim 6 wherein the one or more precursor is selected from the group consisting of hydroxyalkyl esters of vinyl carboxylic acids.

8. The method of claim 7 wherein the one or more precursor is selected from the group consisting of 2-hydroxyethyl methacrylate, N-isobutoxymethyl acrylamide, and N-hydroxyethyl acrylamide.

9. The method of claim 6 wherein the one or more precursor is in the form of an aerosol in a carrier gas when introduced to the plasma in the vicinity of the carbon fiber.

10. The method of claim 6 wherein the product is selected from the group consisting of a belt, a hose, and a tire.

11. The method of claim 9 wherein the carrier gas is air.

12. The method of claim 9 wherein the stream introducing the precursor consists of the precursor in the carrier gas.

* * * * *